W. PITTENGER.
MEAT CUTTER.
No. 3,509. PATENTED MAR. 26, 1844.
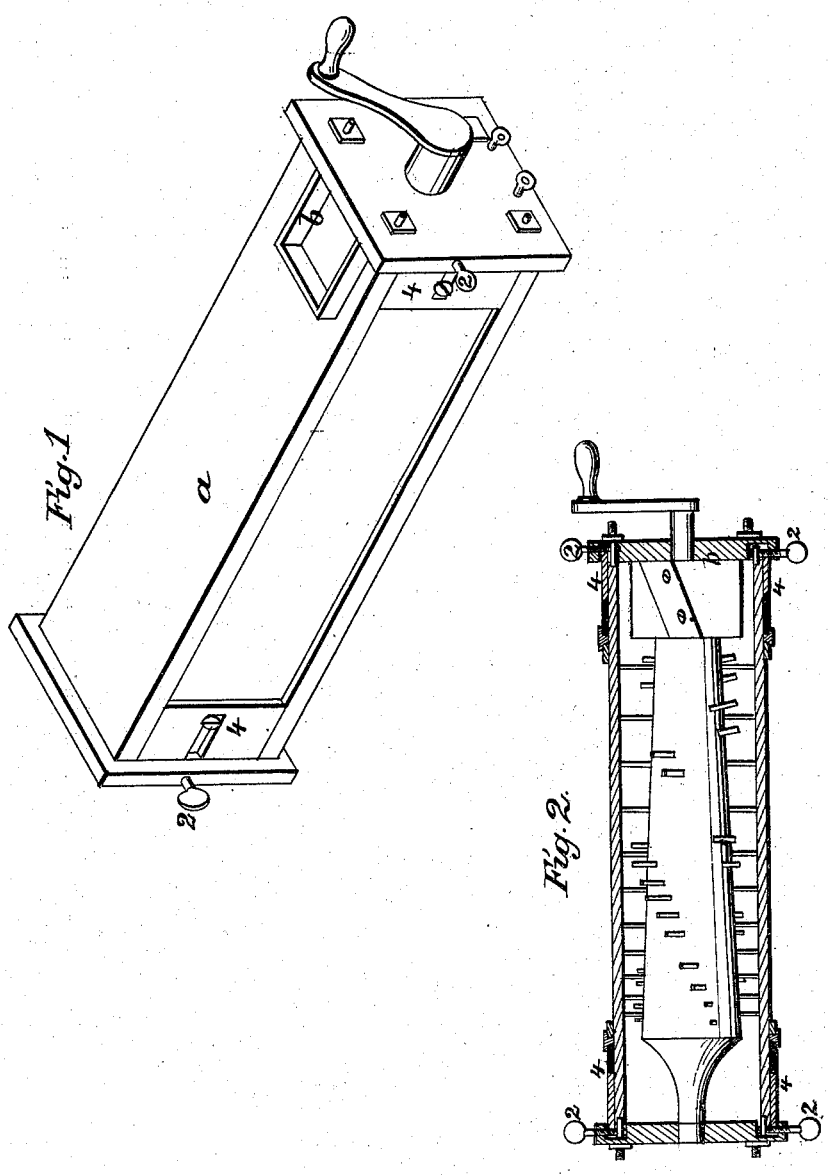

UNITED STATES PATENT OFFICE.

WILLIAM PITTENGER, OF ROME, OHIO.

IMPROVEMENT IN SAUSAGE-MEAT CUTTERS.

Specification forming part of Letters Patent No. 3,509, dated March 26, 1844.

*To all whom it may concern:*

Be it known that I, WILLIAM PITTENGER, of Rome, in the county of Richland and State of Ohio, have invented a new and useful Improvement in Machines for Cutting Sausage-Meat; and I do hereby declare that the following is a full, clear, and exact description thereof, reference being had to the accompanying drawings, which form a part of this specification.

Figure 1 is a side elevation; Fig. 2, a section.

The machine is constructed in many particulars like those now in common use.

An oblong box *a* is made, the inside of which is concave. The bottom and top of this box are stationary, and the sides, which are armed with rows of knives, are so constructed that they can be made to approach or recede from the revolving shaft, which is made like those now in ordinary use, being armed with knives at the end at which the meat enters the hopper *b*, and having spikes the rest of its length for carrying round the meat against the knives stationed in the sides. The side pieces are forced forward toward the shaft by means of wedges 4 at each end, or screws 2 can be substituted. The ends of the sides enter mortises in the end pieces, in which the wedges are also thrust. The sides are thus regulated so as to cut the meat to different degrees of fineness by means of the screws 2, which are put through the sides of the end pieces at right angles to the side pieces and bearing against their ends, which enter the mortise of the end pieces.

Having thus fully described my invention, what I claim as new, and desire to secure by Letters Patent, is—

The adjustable side pieces armed with knives, in combination with the revolving shaft, constructed and arranged in the manner and for the purpose herein set forth.

WILLIAM PITTENGER.

Witnesses:
 CHARLES SAVIERS,
 GEO. W. CLINE.